United States Patent [19]

Laesser

[11] 4,118,111
[45] Oct. 3, 1978

[54] ELECTRO-OPTIC PASSIVE DISPLAY DEVICE AND METHOD FOR ITS MANUFACTURE

[75] Inventor: Claude Laesser, La Chaux-de-Fonds, Switzerland

[73] Assignee: Ebauches S.A., Switzerland

[21] Appl. No.: 782,627

[22] Filed: Mar. 30, 1977

[30] Foreign Application Priority Data

Apr. 2, 1976 [CH] Switzerland ............... 4123/76

[51] Int. Cl.² ........................................... G02F 1/13
[52] U.S. Cl. ................................. 350/334; 350/345
[58] Field of Search ............... 350/160 LC, 334, 345

[56] References Cited

U.S. PATENT DOCUMENTS

| 3,840,695 | 10/1974 | Fischer | 350/160 LC X |
| 4,011,001 | 3/1977 | Moriya | 350/160 LC |
| 4,017,155 | 4/1977 | Yagi et al. | 350/160 LC |
| 4,043,636 | 8/1977 | Eberhardt et al. | 350/160 LC |

*Primary Examiner*—Edward S. Bauer
*Attorney, Agent, or Firm*—Silverman, Cass & Singer, Ltd.

[57] ABSTRACT

A light guiding member for an electro-optic display device. The member is generally plate-shaped with thickened edge portions, one such edge portion forming an enclosure for a light source. The thickened portions are coated with conductive tracks to provide electrical connection between a substrate and display cell of the device.

6 Claims, 1 Drawing Figure

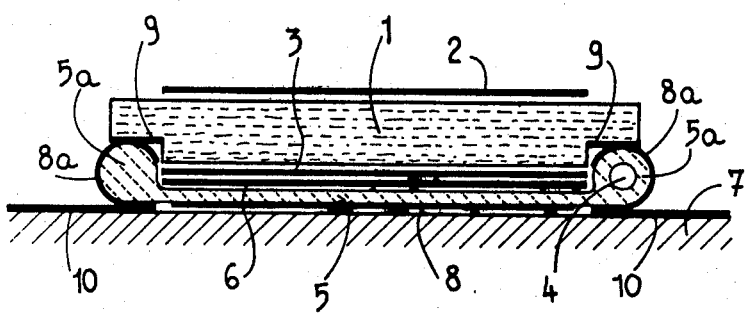

ELECTRO-OPTIC PASSIVE DISPLAY DEVICE AND METHOD FOR ITS MANUFACTURE

BACKGROUND OF THE INVENTION

The present invention relates to an electro-optic passive display device comprising a display cell and, positioned behind the cell, a lighting device comprising a light guiding member.

Light guiding members used for lighting electro-optic passive display cells must produce, on a large portion of their surface, a reflecting effect obtained while metallizing the said surface. The metallized coating has the disadvantage of possibly causing short-circuit of the conductive tracks of the element which electrically connects the tracks of the cell to the tracks of the printed circuit. It therefore generally is necessary either to remove the said metallized coating in the places where short-circuiting may occur, or to cover it with an insulating coating.

SUMMARY OF THE INVENTION

The object of the present invention is to obviate the above disadvantage and even to transform it into an advantage while using, in a preferred embodiment of the invention, the said reflecting metallized coating as a connecting means ensuring the electric connection between the display cell and its control circuit. To this effect, the electro-optic passive display device constructed in accordance with the invention is characterized by the fact that the light guiding member of its lighting device, formed in an insulating transparent material, carries conductive tracks which are in contact on the one hand with conductive tracks carried by the cell, constituting the output terminals of the cell, and on the other hand with conductive tracks connected to the control circuit of the said cell, in such a way that the said light guiding element constitutes an element of connection ensuring the electrical connection between the cell and its control circuit.

A further object of the invention is to provide a method of manufacture of the said electro-optic passive display device which is applied to the case where the light guiding member is coated, on its rear face, with a reflecting metallized coating, its conductive tracks which ensure the electric connection between the cell and its control circuit, being constituted by metallized surfaces which are identical with the said reflecting coating.

The method of manufacture of the invention is characterized by the fact that a conductive metallized coating is deposited on the light guiding member and is then eliminated from the places where it is not desired so as to provide separated conductive tracks on the said light guiding member, which tracks ensure the electric connection between the display cell and its control circuit.

BRIEF DESCRIPTION OF THE DRAWINGS

The drawing shows, by way of example, one embodiment of the invention.

The sole FIGURE is a partially sectional elevational view, of an electro-optic passive display device usable in the field of watch-making.

DESCRIPTION OF THE PREFERRED EMBODIMENT

The display device represented comprises an electro-optic passive display cell 1, with liquid crystal, provided with two polarizers 2 and 3. The device comprises moreover, for permitting reading in the dark, a lighting device comprising a source of light 4 constituted, for instance, by a filament bulb located in a light guiding member 5 made of transparent insulating material, for instance of plastic material such as methacrylate of methyl. A diffuser 6 is interposed between the light guiding member 5 and the rear polarizer 3. The display device has been illustrated resting on a supporting plate 7 which also carries the control circuit of the cell 1.

The rear face of the light guiding member 5 is coated with a metallized coating 8 which functions as a reflector. The two ends of the guiding member 5 are each provided with an embossment 5a in one of which is located the filament bulb 4. Each end of the member 5 is coated with metallized straps, two of which, designated by 8a, are visible in the drawing. The metallized straps 8a are in contact with conductive tracks 9 of the cell 1. The tracks 9 function as the output terminals of the cell. The straps 8a also are in contact with conductive tracks 10, carried by the plate 7, which are connected to the control circuit of the cell 1.

The light guiding member 5 provided with its conductive tracks 8a and with its reflecting surface 8 is formed while protecting first some areas of its front face with a protecting material, and then while metallizing, for instance chemically or under vacuum, the rest of the surface of the member 5, i.e., the rear face and the surface of the embossments 5a. In order to provide for separation of the conductive tracks 8a one from each other, and also separation of the tracks from the rest of the surface 8, the metallized coating is removed where it is not desired. Such removal may be accomplished, for instance, by means of a photo-lithographic or photo-chemical method.

Since the conductive tracks carried by the light guiding member 5 are identical, and since the method of forming the tracks with the reflecting coating of the said guiding member is the same, the formation thereof is inexpensive; moreover, the problems of possible short-circuiting due to the presence of the reflecting metallized coating are also obviated.

What I claim is:

1. An electro-optic display device comprising, a substrate with an electrically conductive track, a display cell with an electrically conductive track spaced from the substrate track, an electrical control circuit connected to the substrate track, a lighting device positioned behind the display cell, the lighting device including a generally plate-shaped light guiding member with two opposite edges and formed of transparent insulating material, each said opposite edge having a respective thickened portion, one of said thickened portions forming an enclosure for a light source, each said thickened portion being coated with a respective conductive track, said thickened portions being interposed between said cell and said substrate, the conductive tracks of said thickened portions being in electrical contact with the respective conductive tracks of the cell and the substrate to render the same electrically connected.

2. A device as claimed in claim 1 in which the light guiding member has a front face and a rear face, the rear face being coated with a metallized reflecting material, the conductive tracks of the thickened portions having metallized surfaces which are identical to the said reflecting material.

3. Method of manufacturing a light guiding member for electro-optic display device, the member being of generally plate-shaped configuration with opposite thickened portions to be disposed between a substrate and display cell of the device, said method comprising the steps of: depositing a conductive metallized coating on a face of the member, and next removing the coating from selected portions only of the member so as to provide separated electrically conductive tracks on the member to electrically connect the substrate to the display cell.

4. Method as claimed in claim 3 including the following step prior to the step of depositing: applying a protective coating to selected portions of the face of the member to protect said portions.

5. Method as claimed in claim 3 in which the step of removing the coating from selected portions only of the member is achieved by photo-lithography.

6. Method as claimed in claim 3 in which the step of removing the coating from selected portions only of the member is achieved by photo-chemistry.

* * * * *